United States Patent Office 3,320,336
Patented May 16, 1967

3,320,336
UNSATURATED POLYESTERS HAVING
BRANCHED STRUCTURES
Roy B. Duke, Jr., Smyrna, Ga., and Milton A. Perry,
Longview, Tex., assignors to Eastman Kodak Company, Rochester, N.Y., a corporation of New Jersey
No Drawing. Filed Nov. 14, 1963, Ser. No. 323,615
17 Claims. (Cl. 260—861)

This invention relates to unsaturated polyesters of certain bifunctional dihydroxy compounds and certain bifunctional unsaturated dicarboxylic acids, to copolymers thereof with ethylenically unsaturated, polymerizable monomers, and to a process for their preparation.

It is known that unsaturated polyesters can be prepared by the reaction of unsaturated dicarboxylic acids and glycols, and that these can then be cross-linked with reactive vinyl monomers to form thermoset resins which have found acceptance as laminating agents, surface coatings, adhesives, and the like. However, the majority of such prior commercially available polyester compositions have relatively poor hydrolytic stability and, accordingly, have not proven entirely satisfactory in applications, where high hydrolytic stability is essential, for example, in the preparation of fiber glass boat hulls. Another disadvantage with most of such prior polyester compositions is that relatively long reaction times are required in their preparations. For example, it is not uncommon in the preparation of unsaturated polyesters from propylene glycol to have reaction times ranging from about 16 to 40 hours. Also, since such unsaturated polyesters are usually prepared by a fusion process at temperatures ranging from about 200–220° C., and this is above the boiling points of the more common glycols, loss of glycols due to distillation takes place and impedes the preparation of the polyesters and also contributes to poor yields. Accordingly, unsaturated polyesters of improved hydrolytic stability and processability are much desired in the art.

We have now found that unsaturated polyesters of desirably improved properties are obtained from bifunctional dihydroxy compounds represented by Formula I and certain bifunctional unsaturated dicarboxylic acids, set forth hereinafter. These new unsaturated polyesters show marked advantages over conventional polyesters prepared from the more common diols, e.g. ethylene glycol, propylene glycol, diethylene glycol, and the like, both in terms of processability and in the characteristics of the resulting thermoset resins. In terms of processability, the new unsaturated polyesters can be prepared in accordance with our invention in much shorter reaction times of about from 5–10 hours. The high boiling points of the dihydroxy compounds, which are substantially above those of the more common glycols, also facilitate the preparation of the unsaturated polyesters. For example, hydroxyneopentyl hydroxypivalate, the lowest member represented by Formula I, has a boiling point above 275° C. at atmospheric pressure; consequently, the new unsaturated polyesters may be processed at the desirably higher temperatures of from 250–260° C. without loss of the glycol. This is a distinct advantage over the processes using the more common glycols at 200–220° C. in that significantly faster esterification rates are obtained at these elevated temperatures. The new polyesters are also particularly stable to thermal and oxidative degradation which results in essentially water-white polymers.

We have found further, that aside from the ease of processing the new polyesters, the dihydroxy compounds of Formula I impart certain advantageous properties to the finished unsaturated polyesters and the thermoset resins derived therefrom. Foremost among these properties is the remarkable resistance of the thermoset resins to hydrolysis in either basic or acidic aqueous media. For this reason, the new thermoset resins are especially useful in the preparation of fiber glass boat hulls and other materials which require outstanding hydrolytic and oxidative stability. This represents a distinct improvement over conventional polyesters which are generally unstable under these conditions. The remarkable hydrolytic stability of the new thermoset resins, we believe, can be attributed largely to the steric hindrance of the individual ester linkages and the neopentyl structures within the polyester.

It is, accordingly, an object of the invention to provide a new class of unsaturated linear polyesters and thermoset resins therefrom that are of outstanding stability to thermal, hydrolytic and oxidative degradation. Another object is to provide compositions of these polymers that are useful as laminating agents, surface coating materials, fiber glass adhesives, and the like. Another object is to provide a process for their preparation. Other objects will become apparent from the description and examples hereinafter.

In accordance with the invention, we prepare our new class of unsaturated polyesters by direct esterification in a melt of a dihydroxy compound represented by the following general structure:

(I) 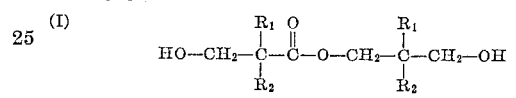

wherein each $R_1$ and $R_2$ represent the same or different alkyl groups of from 1–4 carbon atoms, e.g. methyl, ethyl, propyl, isopropyl, butyl, sec. butyl, etc. groups, with a bifunctional unsaturated dibasic acid such as maleic anhydride, maleic acid, fumaric acid, tetrahydrophthalic acid, tetrahydrophthalic anhydride, chloromaleic acid, itaconic acid, citraconic acid and mesaconic acid, a temperatures above 20° C., and preferably about from 220–260° C., with or without an esterification catalyst as desired, until the acid number (mg. KOH/gm. polyester) of the polymer reduces to 30 or below. Mixtures of two or more of the dihydroxy esters and the acids can be used. Advantageously, the esterification is carried out under an inert atmosphere such as a stream of nitrogen which serves to protect the reactants from oxidative discoloration and also aids in sweeping the water out of the system as formed. The proportions of the dihydroxy compound and the unsaturated dibasic acid employed are approximately equimolar, and preferably with a slight molar excess of the dihydroxy compound. Pressures can be varied from below to above normal atmospheric pressures. The polyesters obtained have molecular weights ranging from about 750 to 5000. They may also be obtained in modified form by substituting in the esterification reaction up to about 50 mole percent (for example, 10–50 mole percent) of the dihydroxy compound with one or more different bifunctional dihydroxy components such as an aromatic, alicyclic or acyclic diol. The unsaturated dibasic acid can also be substituted up to about 50 mole percent thereof (for example, 10–50 mole percent) with one or more saturated aromatic, alicyclic or acyclic dicarboxylic acids. This permits tailoring of the physical properties of the polyesters to specific applications.

The resulting unsaturated polymers can then be blended with one or more monoethylenically unsaturated, polymerizable monomers containing a —CH=C< group, and preferably a $CH_2$=C< group, such as for example, styrene and its derivatives and homologues, diallyl phthalate, divinylbenzene, acrylic acid or methacrylic acid and their derivatives such as esters, amides or nitriles, e.g. methyl acrylate, methyl methacrylate, n-butyl methacrylate, acrylamide, methacrylamide, acrylonitrile, methacrylonitrile etc., vinyl ethers and esters, e.g. vinyl acetate, vinyl propionate, methyl vinyl ether, etc., and subsequently copolymerized in the conventional way, for example, by the action of light and heat, and more especially by the use of polymerization catalysts such as benzoyl peroxide, acetyl peroxide, lauryl peroxide, t-butyl hydroperoxide, alkyl percarbonates, acetone peroxides, azo-bis-isobutyronitrile, persulfates such as sodium, potassium or ammonium persulfates, and the like, to yield thermoset resins having the mentioned utility. The proportions are chosen to give workable compositions, for example, from about 50–90% by weight of the polyester component and from 50–10% by weight of the polymerizable monomer. A mixture of approximately 70% by weight of polyester and 30% by weight of styrene is an especially useful composition.

Suitable different modifying diols (designated (A) herein) include ethylene glycol, propylene glycol, diethylene glycol, dipropylene glycol, 1,3-butanediol, 1,4-butanediol, 1,5-pentanediol, 1,2-pentanediol, neopentyl glycol, hexamethylenediol, decamethylenediol, 2,2,4-tri-methyl-pentanediol, 2-ethyl-1,3-hexanediol, trimethylene glycol, 2-methyl-2-propyl-propanediol, 2-ethyl-2-butyl-propanediol, 2,2-diethyl-propanediol, 2-isobutyl-2-ethyl-propanediol, 1,4-cyclohexanedimethanol, 1,3-cyclohexanedimethanol, and 2,2,4,4-tetra-alkyl-1,3-cyclobutanediols such as 2,2,4,4 - tetramethyl-1,3-cyclobutanediol. Suitable saturated modifying dibasic acids (designated (B) herein) include: phthalic, isophthalic, terephthalic, malonic, dimethylmalonic, succinic, glutaric, adipic, pimelec, suberic, azelaic, sebaic, 1-4-cyclohexanedicarboxylic, 1,3-cyclohexanedicarboxylic, 1-2-cyclohexanedicarboxylic, $\alpha$-ethyl-suberic, oxalic, $\alpha,\alpha$-diethyladipic, dicarboxy diethyl ether, sulfonyldipropionic, p,p'-sulfonyldibenzoic, 4,4-diphenic, 4,4' benzophenonedicarboxylic, di-p-carboxyphenyl alkanes (1 to 10 carbon atoms), etc. acids.

The dihydroxy compounds represented by structure I can be prepared according to the general method described by Franke and Kohn, Monatsh., 25, 865 (1904), wherein 2,2-dimethyl-1,3-propanediol (hydroxypivalate) is prepared by the self-condensation of hydroxypivaldehyde using $Mg(OC_2H_5)I$ as a catalyst. Other hydroxyaldehydes having neopentyl structure can be similarly condensed to the corresponding dihydroxy esters. An alternative method for preparing the dihydroxy compounds is described in our copending applications Ser. Nos. 232,553 now U.S. Patent No. 3,120,442 and 232,603, both filed Nov. 14, 1963, which comprises a noncatalytic, crossed Tischenko reaction [J. Russ. Phys. Chem. Soc., 38, 355 (1906)] between a tertiary formaldol and an aldehyde, at a temperature of from about 100–300° C., over a period of from 1–48 hours, in the proportions of about 3–5 moles of the aldehyde to each mole of the tertiary formaldol. For example, isobutyraldehyde and hydroxypivaldehyde give hydroxyneopentyl hydroxypivalate which can be readily isolated from the reaction mixture by fractional distillation. By appropriate selection of aldehydes and tertiary formaldols, other of the dihydroxy compounds coming within structure I can be prepared. Suitable tertiary formaldols include, for example, hydroxypivaldehyde, 2,2,diethyl-3-hydroxypropanal, 2,2-di - n - propyl-3-hydroxypropanal, 2,2-diisopropyl-3-hydroxypropanal, 2,2 - di - n-butyl-3-hydroxypropanal, 2-methyl-2-ethyl-3-hydroxypropanal, 2-ethyl-2-n-butyl-3-hydroxypropanal, 2-ethyl-2-isobutyl-3-hydroxypropanal, etc. Suitable aldehydes include, for example, acetaldehyde, propionaldehyde, isobutyraldehyde, n-butyraldehyde, etc. Mixtures of the formaldols and mixtures of the aldehydes can also be used.

The following examples further illustrate the unsaturated polyesters and thermoset resins of the invention.

*Example 1.—Maleic anhydride—phthalic anhydride—hydroxyneopentyl hydroxypivalate copolymer*

Maleic anhydride, 24.5 grams (0.25 mole); phthalic anhydride, 37 grams (0.25 mole); and hydroxyneopentyl hydroxypivalate, 113 grams (0.565 mole), were combined in a 1-liter, 3-neck flask equipped with stirrer, distillation arm, and gas inlet tube extending beneath the surface of the reactants. No catalyst was employed. The nitrogen purge entered the flask through one arm and exited beneath the surface of the reactants. This served the dual purpose of protecting the reactant from oxidative discoloration and also aided in sweeping the water formed during esterification into the distillation arm where it was condensed and removed. The reactants were heated at 85–95° C. for one hour. Following this initial reaction period, the reactants were heated rapidly to 230° C. to complete the esterification. Samples were withdrawn from the flask periodically and titrated with standard sodium hydroxide to determine the progress of the reaction. After seven hours, the acid number of the polymer had dropped to 28. The polymer was then cooled to 80–90° C. and blended with styrene (30% by weight). Hydroquinone (.01%) was added as polymerization inhibitor. The resulting polyester-styrene solution was clear and essentially water-white. The polyester-styrene solution was polymerized with a peroxide catalyst at 90° C. to yield a rigid, thermoset resin. The resin was clear and faintly yellow in color. Fiber glass laminates prepared with the polyester-styrene solutions, on curing, showed outstanding resistance to hydrolytic degradation when treated with hot water.

*Example 2.—Isophthalic acid—fumaric acid—hydroxyneopentyl hydroxypivalate copolymer*

Isophthalic acid, 33.2 grams (0.2 mole), and hydroxyneopentyl hydroxypivalate, 120.5 grams (0.59 mole), were combined in the apparatus previously described. The reactants were heated rapidly to 240–250° C. and processed to an acid number below 10. This took three to four hours. The mixture was then cooled to 170° C. and 34.8 grams (0.3 mole) of fumaric acid was added. The polyester was then processed for an additional six hours until an acid number below 30 was obtained. The polyester was then cooled to 80–90° C., and 30 milligrams of hydroquinone and 62 grams of styrene (30% by weight) were added. The resulting styrene-polyester solution was clear and essentially water-white. The styrene-polyester solution was copolymerized by the addition of a peroxide catalyst yielding a clear, rigid, thermoset resin. The solutions had excellent adhesive properties and were useful as laminating agents for wood, metals, fiber glass, etc. The laminated materials on curing showed high stability toward thermal, hydrolytic and oxidative degradation.

*Example 3.—Maleic anhydride—tetrahydrophthalic anhydride—hydroxyneopentyl hydroxypivalate copolymer*

Maleic anhydride, 24.5 grams (0.25 mole), tetrahydrophthalic anhydride, 38 grams (0.25 mole), and hydroxyneopentyl hydroxypivalate, 112 grams (0.55 mole), were combined in the apparatus previously described. The reactants were heated at 80–90° C. for 40 minutes and then heated rapidly to 220–230° C. The reactants were processed at this temperature until an acid number below 30 was obtained. Total processing time was nine hours. The mixture was then cooled to 80–90° C. and blended with styrene (30% by weight). The styrene solution was clear and essentially colorless. Hydroquinone was added as polymerization inhibitor. The styrene-polyester solution was polymerized by the addition of a peroxide catalyst. The resulting polymer was a clear, essentially water-white thermoset resin having high hydrolytic stability, and especially useful for fiber glass laminates.

The polyesters of above Examples 1, 2 and 3 were liquids having viscosities related to temperature and molecular weight, the latter being about 885, 2960 and 1570, respectively.

By substitution of other of the dihydroxy compounds coming within Formula I in equivalent amounts for the hydroxyneopentyl hydroxypivalate in the above examples, there are obtained the corresponding unsaturated linear polyesters having generally similar improved resistance to thermal, hydrolytic and oxidative degradation. Also, in place of the styrene in the above examples, there may be substituted a like amount of any other of the mentioned reactive monomers to give generally similar stable thermoset resins.

The invention has been described in detail with particular reference to preferred embodiments thereof, but it will be understood that variations and modifications can be effected within the spirit and scope of the invention as described hereinbefore and as defined in the appended claims.

What we claim is:

1. An unsaturated polyester having a molecular weight in the range of about 750–5000 of equimolecular amounts of (1) a bifunctional dihydroxy organic compound of which at least 50 mole percent has the general structure:

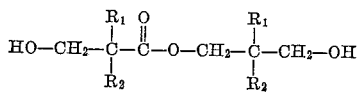

wherein each of $R_1$ and $R_2$ represents an alkyl group having 1–4 carbon atoms, and (2) a bifunctional dicarboxylic acid of which at least 50 mole percent is an unsaturated dibasic acid selected from the group consisting of maleic acid, maleic anhydride, fumaric acid, tetrahydrophthalic acid, tetrahydrophthalic anhydride, itaconic acid, citraconic acid, mesaconic acid and chlorine substituted derivatives of said acids.

2. This unsaturated polyester according to claim 1 wherein the said dihydroxy compound having said general formula is hydroxyneopentyl hydroxypivalate.

3. The unsaturated polyester according to claim 2 wherein all of said dihydroxy compound is hydroxyneopentyl hydroxypivalate.

4. The unsaturated polyester according to claim 2 wherein the said unsaturated dibasic acid is maleic anhydride.

5. The unsaturated polyester according to claim 4 wherein the said unsaturated dibasic acid is substituted from about 10 to about 50 mole percent thereof with phthalic anhydride.

6. The unsaturated polyester according to claim 4 wherein the said unsaturated dibasic acid is substituted from about 10 to about 50 mole percent thereof with tetrahydrophthalic anhydride.

7. The unsaturated polyester according to claim 2 wherein the said unsaturated dibasic acid is fumaric acid.

8. The unsaturated polyester according to claim 7 wherein the said unsaturated dibasic acid also is substituted from about 10 to about 50 mole percent thereof with isophthalic acid.

9. A composition comprising from 50–75% by weight of the polyester according to claim 1 and from 50–25% by weight of a monoethylenically unsaturated polymerizable monomer having a $CH_2=C<$ group.

10. A composition comprising from 50–75% by weight of the polyester according to claim 1 and from 50–25% by weight of styrene.

11. A composition comprising from 50–75% by weight of the polyester according to claim 3 and from 50–25% by weight of a monoethylenically unsaturated, polymerizable monomer having a $CH_2=C<$ group.

12. A composition comprising from 50–75% by weight of the polyester according to claim 4 and from 50–25% by weight of styrene.

13. A composition comprising from 50–75% by weight of the polyester according to claim 8 and from 50–25% by weight of styrene.

14. A composition comprising from 50–75% by weight of the polyester according to claim 6 and from 50–25% by weight of styrene.

15. A thermoset resin comprised of the polyester of claim 1 copolymerized with a monoethylenically unsaturated, polymerizable monomer containing a $CH_2=C<$ group.

16. A thermoset resin comprised of a copolymer of the polyester of claim 1 with a monoethylenically unsaturated polymerizable monomer containing a $CH_2=C<$ group, said polyester being present in amounts of from 50–75% by weight and said monomer in amounts of from 50–25% by weight.

17. A thermoset resin as described in claim 16 wherein said monomer is styrene.

References Cited by the Examiner

UNITED STATES PATENTS

| | | | |
|---|---|---|---|
| 3,042,650 | 7/1962 | Bockstahler | 260—861 |
| 3,057,911 | 10/1962 | Finch | 260—484 |
| 3,157,713 | 11/1964 | Leese | 260—873 |
| 3,249,653 | 5/1966 | Amerongen et al. | 260—861 |
| 3,250,738 | 5/1966 | Isaacs et al. | 260—873 |

FOREIGN PATENTS

| | | |
|---|---|---|
| 1,029,147 | 4/1958 | Germany. |
| 1,271,106 | 7/1961 | France. |
| 1,303,888 | 8/1962 | France. |

MURRAY TILLMAN, *Primary Examiner.*

J. T. GOOLKASIAN, *Assistant Examiner.*